Figure 1:
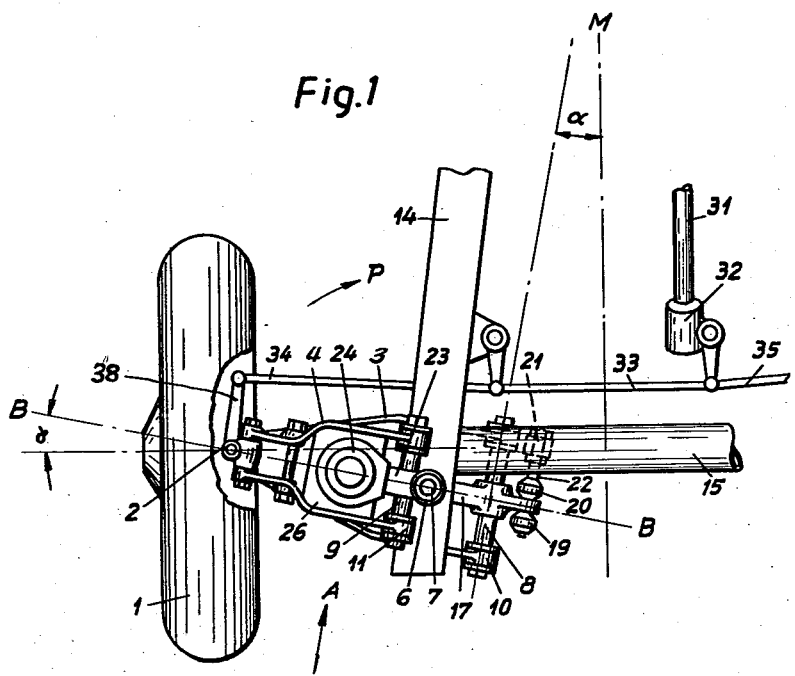

INVENTOR
Max Wagner 2,708,586

INDEPENDENT WHEEL SUSPENSION, IN PARTICULAR FOR THE DIRIGIBLE FRONT WHEELS OF MOTOR VEHICLES

Max Wagner, Stuttgart, Germany, assignor to Daimler-Benz Aktiengesellschaft, Stuttgart-Unterturkheim, Germany Application September 13, 1949, Serial No. 115,402

Claims priority, application Germany May 7, 1949

5 Claims. (Cl. 280—95)

The present invention relates to an independent wheel suspension, in particular of the dirigible front wheels of motor vehicles, and consists especially in that the guide members or links of the wheels, of which preferably two are provided in superposed relationship for each wheel, are resiliently supported in the chassis, frame or superstructure of the vehicle so that the wheels may swing or oscillate in a vertical or almost vertical plane, which slants backwardly from the center longitudinal plane of the vehicle, and so that they may give way together with the wheel suspension about a substantially vertical axis of rotation. The lower guide member is preferably made longer than the upper guide member. Furthermore, a spring and a shock absorber, especially one located within the spring, are provided advantageously in accordance with the present invention which cooperate with the guide members of the wheel suspension to form a particularly favorable wheel suspension.

Accordingly, it is an object of the present invention to provide a wheel suspension for dirigible front wheels of motor vehicles which offers particularly favorable relations of the forces transmitted from the road to the vehicle via the suspension.

It is another object of the present invention to provide a wheel suspension for front dirigible wheels which may rotate about a vertical support member so as to absorb shocks and forces acting on the corresponding wheel by rotating a slight amount about this vertical axis.

A still further object of the present invention resides in the provision of a wheel suspension for dirigible front wheels in which forces directed both in the longitudinal and transverse direction of the vehicle may be resiliently absorbed by permitting the suspension together with the wheel to rotate slightly about a vertical support member provided in the frame, chassis, or superstructure of the vehicle.

It is a still further object of the present invention to provide a wheel suspension for dirigible front wheels which results in a very favorable spatial arrangement insofar as interior spaciousness of the vehicle is concerned by permitting the drive unit to be moved forwardly a slight amount owing to the particular inclination of the wheel suspension in which the guide arms and the plane of oscillation thereof slants backwardly to form an angle with the longitudinal central plane of the vehicle which angle is different from 90°.

A still further object of the present invention is the provision of a wheel suspension which produces downwardly directed forces at the front of the car when the brakes are suddenly applied so that the mass of the vehicle will produce forces resulting in a stable road position.

A particularly favorable relationship of the forces in the vehicle and especially a very effective absorption of those forces, which impinge on the wheels from the road, are attained by the particular combination according to the present invention which combines the slanting arrangement of the wheel suspension, on the one hand, with a flexible suspension about a substantially vertical axis of rotation, on the other. In case of shocks or forces to which the wheels are exposed when passing over the unevennesses or bumps in the road and which will produce forces acting on the wheels the wheels will assume a relatively stable position and, at the same time, are able to avoid or move out of the path of the obstacle by rotating about the vertical axis slightly in the backward direction.

A further advantage of the present invention resides in the fact that, if the vehicle is suddenly braked, the inertia of the mass of the vehicle produces a component directed downwardly at the front end of the car so that the vehicle will continue to maintain its stable position on the road. The braking forces are thereby flexibly or resiliently absorbed. Moreover, the inclined position of the wheel suspension provides a favorable spatial arrangement, primarily by reason of the fact that the driving or power unit located between the wheels may be moved forwardly to some extent without hindering or impeding the operation of the wheel suspension, since the connections of the guide members to the vehicle superstructure, chassis or frame are located further forwardly by the particular inclination of the suspension. A space saving arrangement of only a few inches may thereby be of considerable importance insofar as the interior spaciousness of the vehicle is concerned with a given wheel base.

Figure 2:
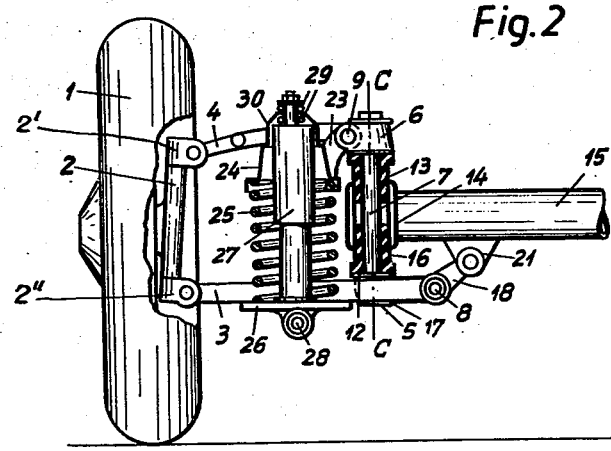

Further objects, advantages and features of the present invention will become more obvious from the following description when taken in connection with the accompanying drawing which shows for purposes of illustration only one embodiment in accordance with the present invention, and wherein Figure 1 is a top view of the wheel suspension of one of the front wheels in accordance with the present invention, and Figure 2 is a front elevational view of the front wheel suspension taken in the direction of arrow A of Figure 1 and showing certain features partly in cross section taken along line B—B of Figure 1.

Referring now more particularly to the drawing wherein like reference numerals are used throughout the various views thereof to designate like parts, reference numeral 1 designates the front wheel which is carried by the dirigible or steerable wheel carrier, which, in its turn, is rotatably supported for purposes of steering in appropriate joint members 2' and 2" by means of which it is articulately connected to a lower, longer guide member 3 and to an upper guide member 4. The lower guide member 3 is preferably made longer than the upper guide member 4. The lower guide member 3 is supported at a support pivot or support member 7 by means of a connecting joint member 5, and the upper guide member is supported at the support member 7 by means of a connecting joint member 6. The support member 7, which is substantially vertical and effectively constitutes a vertical king pin, forms a unitary structure with the joint members 5 and 6 or may be rigidly connected thereto in any conventional manner. In order to provide pivotal movement the joint members 5 and 6 are provided with cross bolts 8 and 9, on the ends of which the joint eyelets 10 and 11 of the two web-shaped arms of the guide members 3 and 4 are pivotally supported. The vertical support member 7, in its turn, is elastically supported, preferably by the intermediary of rubber buffers 12 and 13, in the chassis, frame or superstructure of the vehicle, especially by means of a vertical tubular member 16, into which the support member 7 is inserted, which tubular member 16 traverses the longitudinal frame member 14 near the cross-member 15 and which tubular member 16 is securely welded to the longitudinal frame member 14 so that the support member 7 may resiliently or elastically give way about its vertical axis C—C. For purposes of such elastic suspension the support member 7 is provided with an inwardly directed arm 17 which, on the one hand, serves as support for the bolt 8 on which are mounted pivotally the two arms of the lower guide member 3, and, on the other hand, as an elastic support for the support member 7 in the direction of rotation thereof about its axis C—C by means of the arm extension 18. In that connection, the extension 18 abuts against two rubber buffers 19 and 20 which are carried by a bolt 22 supported in the bracket 21 on the cross member 15. The buffers 19 and 20 may be held in pre-stressed condition, if so desired. The upper spring abutment member 24 for the spring, preferably a coil spring 25, is rigidly connected in any conventional manner to the joint member 6, which carries the upper guide member 4 by cross bolt 9, through the intermediary of an arm 23, as, for example, by welding. The spring abutment member 24 may be bell-shaped. With its other end the spring 25 abuts against a cross-web 26 of the lower guide member 3, which cross-web may be, for example, in the shape of a plate. Moreover, the shock absorber, for example, a hydraulic and preferably a telescopic type shock absorber 27 is located within the coil spring 25. The shock absorber 27, in its turn, is articulately connected by means of a lower joint 28, preferably a flexible joint, to the cross-web 26 and with its upper end thereof to a cap 30 by means of, for example, annular rubber buffers 29 whereby the cap 30 is welded to the bell-shaped spring abutment member 24.

The front wheels are steered by means of the steering column 31, which operates the tri-partite steering links 33, 34 and 35 through the steering gear 32. The links 34 and 35 which are connected with the wheel carrier 2 by appropriate connecting links 38 to rotate the wheel carrier 2 during movement of the links 34 and 35, are arranged appropriately parallel or nearly parallel with respect to the planes of swinging movements or oscillations of the corresponding wheel suspensions, so that, for example, the link 34 will also form an angle α or approximately that angle with a vertical cross plane of the vehicle.

A stabilizer, which, for example, may be in the form of a torsion bar, may be used, if so desired, to connect the wheel suspension of the wheel shown in the drawing with the suspension of the opposite wheel, which has been arranged symmetrically with respect to the longitudinal center plane M—M of the vehicle. To that end, the stabilizer may be connected advantageously to the lower guide members, by means of, for example, vertical guide members.

The axes of the joint bolts 8 and 9 for the lower and upper guide member respectively extend, as shown in Figure 1, slantingly with respect to the longitudinal axis of the vehicle, so that they form an angle α with the center longitudinal axis M—M of the vehicle, whereby intersections thereof with the center longitudinal axis M—M are located behind the front axle. In conformity therewith, the plane of oscillations B—B of the wheel also forms a corresponding angle α with the cross plane of the vehicle which includes the steering journal of the wheel.

If the front wheel 1, for example, while traversing an unevenness of the road, is hit by a shock in the direction opposite to the travelling direction, then the wheel together with the entire wheel suspension including the spring 25 and the shock absorber 27 is able to give way somewhat by rotating as a unit in the direction of the arrow P around the support member 7, whereby the shock is elastically absorbed by means of the rubber buffers 19 and 20.

Similarly, if shocks or forces from the road impinge upon the wheel in a transverse direction, i. e., in a direction substantially perpendicular to the longitudinal direction of the vehicle, such transversely directed shocks or forces may also be absorbed appropriately by enabling the wheel together with the wheel suspension to give way by rotating about the axis C—C so that such shocks and forces are absorbed by rubber buffers 19 and 20.

Since the slanting arrangement permits the absorption of forces, which act on the wheel in a longitudinal as well as in a transverse direction, by means of rubber buffers 19 and 20 by reason of the rotation of the wheel suspension as a whole, which results therefrom, rubber bushings 12 and 13 may be made of relatively harder material to provide a more stable suspension, as the absorption of transversely directed shocks and forces becomes less significant, in sofar as these rubber bushings 12 and 13 are concerned.

If need be, the spring 25 as well as the shock absorber 27 may be connected at their upper ends, if so desired, to the superstructure of the vehicle, preferably by a supporting bracket which is rigidly secured to the superstructure, frame or chassis of the vehicle, while the other ends of the shock absorber 27 and of the spring 25 abut against one of the wheel guide members, preferably against the lower guide member 3. It is also possible to connect one end of the spring and one end of the shock absorber to one of the guide members and the other end of each to the superposed guide member.

The term "chassis" as used hereinafter in the claims is intended to include also the chassis of frameless vehicles.

Furthermore, it is also noted that the construction in accordance with the present invention may also be carried out in such a way that the support member 7 is stationary while the guide members 3 and 4 are rotatable around the support member by means of appropriate joints or connections.

Instead of using rubber for the sleeves surrounding the support member 7 and for the supports 19 and 20 of the extension arm 18 of the support member 7 as well as for the connections of the shock absorber 27, elastic synthetic artificial products may also be used to assure proper flexibility and elasticity such as, for example, certain artificial resins or other elastic or yielding means. In the case of the aforementioned supports springs may be also provided.

While a preferred embodiment of my invention has been described and illustrated herein, it is to be understood that various modifications as to form, structure, and use of materials may be made without departing from the spirit and scope of the invention as claimed.

I claim:

1. In a vehicle having a chassis, an independent front wheel suspension for steerable front wheels of a vehicle comprising a wheel carrier, a pair of superposed guide members for guiding said wheel carrier in an up and down movement, a substantially vertical support member, means supporting said support member on the vehicle chassis to provide yieldable movement thereof about its vertical pivot axis, means connected to said support member and to said chassis for elastically resisting the movement of said support member about the axis thereof, means pivotally connecting said upper guide member to said support member and to said wheel carrier and means pivotally connecting said lower guide member to said support member and to said wheel carrier to provide a swinging movement for said wheel carrier and guide members about substantially horizontal axes, said substantially horizontal axes being non-parallel with the central longitudinal plane of the vehicle and extending slantingly backwards at an angle towards the central longitudinal plane of the vehicle, and spring means including shock absorber means abutting, on the one hand, against one of said guide members and, on the other hand, against said support member.

2. The combination according to claim 1, further comprising a steering link system including three steering links articulately connected to one another in a transverse direction of said vehicle, the steering links adjacent said wheels forming an angle with the vertical cross plane of said vehicle, as seen in a plan view, generally similar to said first-mentioned angle, said vertical cross plane being perpendicular to said central longitudinal plane.

3. The combination according to claim 1, wherein said second-mentioned means comprises a short arm connected at one end thereof to the lower end of said support member and elastic members secured to said chassis for elastically supporting the other end of said arm against said chassis.

4. The combination according to claim 1, wherein said first-mentioned means comprises a rubber sleeve surrounding said support member to elastically support the same on said vehicle chassis.

5. In a vehicle having a chassis, an independent wheel suspension for a dirigible front wheel of motor vehicles, a pair of spaced superposed guide members for said wheel, a support member, means yieldably supporting said support member on the chassis to yield about a substantially vertical axis, means connecting the upper and the lower guide members to said support member for movement of said guide members in a substantially vertical plane forming a non-rectangular angle with the vertical central longitudinal plane of the vehicle, said substantially vertical plane intersecting said vertical central longitudinal plane in front of the axis of said front wheel, means connected to said support member and to said chassis for elastically resisting the movement of said support member about the axis thereof, spring means, and a shock absorber located within said spring means, said spring means and said shock absorber abutting, on the one hand, against one of said guide members and, on the other hand, against said support member.

References Cited in the file of this patent

UNITED STATES PATENTS

| | | |
|---|---|---|
| 2,039,671 | Wagner | May 5, 1936 |
| 2,232,173 | Frohlich | Feb. 18, 1941 |
| 2,254,491 | Olley | Sept. 2, 1941 |
| 2,305,802 | Balz | Dec. 22, 1942 |
| 2,314,505 | McIntyre et al. | May 23, 1943 |
| 2,334,597 | Badertscher | Nov. 16, 1943 |
| 2,338,478 | Wulff | Jan. 4, 1944 |
| 2,403,145 | Ulrich | July 2, 1946 |
| 2,497,252 | Adams | Feb. 14, 1950 |

FOREIGN PATENTS

| | | |
|---|---|---|
| 495,712 | Great Britain | Nov. 14, 1938 |